United States Patent [19]

Gietman, Jr.

[11] Patent Number: 4,934,993
[45] Date of Patent: Jun. 19, 1990

[54] BAG MAKING APPARATUS WITH AUTOMATIC COMPENSATION SYSTEM

[75] Inventor: Peter J. Gietman, Jr., Combined Locks, Wis.

[73] Assignee: Custom Machinery Design, Inc., Appleton, Wis.

[21] Appl. No.: 377,240

[22] Filed: Jul. 7, 1989

Related U.S. Application Data

[63] Continuation of Ser. No. 194,654, May 15, 1988, abandoned.

[51] Int. Cl.5 .................... B31B 1/64; B31B 19/00
[52] U.S. Cl. .................................. 493/11; 493/24; 493/29; 493/187; 493/188; 493/202; 493/205; 493/208
[58] Field of Search ............... 493/11, 24, 29, 187, 493/188, 202, 205, 208; 226/27, 28, 45

[56] References Cited

U.S. PATENT DOCUMENTS

| | | | |
|---|---|---|---|
| 4,216,705 | 8/1980 | Achelpohl et al. | 493/11 |
| 4,380,446 | 4/1983 | Dickson et al. | 493/208 |
| 4,642,084 | 2/1987 | Gietman, Jr. | 493/190 |

Primary Examiner—Frederick R. Schmidt
Assistant Examiner—Jack W. Lavinder
Attorney, Agent, or Firm—Foley & Lardner

[57] ABSTRACT

A machine for making plastic bags from plastic film utilizes a rotatable drum having an adjustable diameter. The drum is constructed of a plurality of slats and includes a gear mechanism adapted for infinite variation of the drum diameter between a first smaller diameter and second larger diameter. A sealing blanket is provided for the drum and is automatically adjusted for different drum diameters to provide proper tension of the film as it passes around the expandable drum. The gear mechanism is operated manually or automatically by a motor mounted in the drum and can alter the drum diameter while the machine is running.

A chill roll, a rotary handle hole punching unit, a perforator/cutter station and phase variators are also included. When the machine is used to make bags having printed material thereon, a comparator unit may also be used. The comparator unit uses an electric eye adjacent the drum to determine the spacing between activated sealing bars and an optical reader to determine the spacing between printing on the film. A mocroprocessor system compares these measured spacings to a preselected spacing interval. The microprocessor system activates the drum motor to adjust the spacing between heat seals and printed matter on the bag. The machine checks spacing on an ongoing basis to maintain proper spacing.

7 Claims, 3 Drawing Sheets

BAG MAKING APPARATUS WITH AUTOMATIC COMPENSATION SYSTEM

CROSS-REFERENCE TO RELATED APPLICATIONS

This is a continuation of Ser. No. 194,654, filed 5/16/88, now abandoned.

BACKGROUND OF THE INVENTION

1. Field of the Invention

The invention relates generally to the art of plastic bag making machines. More specifically, the present invention relates to a bag machine which employs a rotary sealing drum. Still more specifically, the present invention relates to a bag machine in which the sealing drum is adjustable in size to produce different bags of different sizes and in which the drum mechanism is designed to compensate automatically for slight corrections in the spacing of heat seals while the bag making machine is operating.

2. Description of Related Areas of Art

Many different types of plastic bag making machines are known to the art for producing plastic bags for industrial and individual consumers for many different applications (e.g. small sandwich bags and trash bags). While the present invention has a wide range of applications for the production of such products, the related art will be explained by reference to one particular class of bags, i.e., polyethylene trash bags or, garbage bags and wastebasket liners of the type usually sold in boxes of folded bags or rolls of bags.

Further discussion of the history and operation of these machines can be found in U.S. Pat. No. 4,642,084 entitled "Plastic Bag Making Machine", issued to the present inventor on February 10, 1987 and assigned to Custom Machinery Design, Inc. ("Gietman U.S. Pat. No. '084"). That patent discloses a bag machine which includes a rotary drum constructed of a plurality of slats and which includes a gear mechanism adapted for infinite variation of the drum diameter between a first smaller diameter and a second larger diameter. A sealing blanket is provided for the drum and is automatically adjusted for different drum diameters to provide proper tension on the film as it passes around the expandable drum.

In that configuration, manual rotation of a hex nut assembly while the machine is stopped increases or decreases the drum's diameter through a series of appropriately mounted mitre gears and ring gears. Once this adjustment is made, the machine begins operation. Readjustment of the drum diameter can only be accomplished by stopping the machine to adjust the hex nut assembly.

Additionally, very small errors in drum diameter size can lead to acute problems, particularly when the film passing through the machine has preprinted material thereon which has to appear at the same relative position on each bag. An error of a fraction of an inch leads to serious problems when the bag width is only several inches across and the speed of the film moving through the machine is 500-900 bags per minute. By the time the error is detected, a considerable amount of film is wasted. Furthermore, the mistake is irreparable since the heat seals and perforations can not be "corrected".

A bag making machine which overcomes these shortcomings and those noted in the Gietman U.S. Pat. No. '084 would represent a considerable advancement in the art.

OBJECTS AND SUMMARY OF THE INVENTION

It is a primary object of the present invention to provide a plastic bag making machine which can adjust for different bag sizes without requiring the machine to be stopped.

It is another object of the present invention to provide a plastic bag making machine which is adjustable to produce a wide variety of bag sizes and types from various thicknesses of plastic film.

Another object of the present invention is to provide a plastic bag making machine which is operable in either a manual or automatic adjustment mode.

It is still a different object of the present invention to provide a plastic bag making machine which automatically compensates for errors in sizing of bags by adjusting its sealing apparatus to the bag size being produced without having to stop the machine.

How these and further objects of the invention are accomplished will be described by reference to the following description of a preferred embodiment of the invention taken in conjunction with the FIGURES. Generally, however, the objects are accomplished in a plastic bag making machine utilizing a rotatable drum having an adjustable diameter and a number of sealing bars, one or more of which may be selectively activated. The drum is constructed of a plurality of slats and includes a gear mechanism adapted for infinite variation of the drum diameter between a first smaller diameter and second larger diameter. A sealing blanket is provided for the drum and is automatically adjusted for different drum diameters to provide proper tension of the film as it passes around the expandable drum. The gear mechanism is operated by a motor mounted in the drum and can alter the drum diameter while the machine is running. Operation of the motor can be manual or automatic.

A chill roll, a rotary handle hole punching unit, a perforator/cutter station and phase variators are also included in the preferred embodiment, but are generally known in the art. When the machine is used to make bags having printed material thereon, a comparator unit is used. The comparator unit uses an electric eye or other appropriate sensor adjacent the drum to determine the spacing between activated sealing bars. An optical reader is used to determine the spacing between printing on the film. A microprocessor system compares these measured spacings to a preselected spacing interval. The microprocessor system then activates the drum motor if necessary to adjust the spacing between heat seals and printed matter on the bag. The machine checks spacing on an ongoing basis to maintain proper spacing.

Other variations and modifications of the invention will become apparent to those skilled in the art after reading this specification and are deemed to fall within the scope of the present invention if they fall within the scope of the claims which follow the description of the preferred embodiment.

Figure 1:
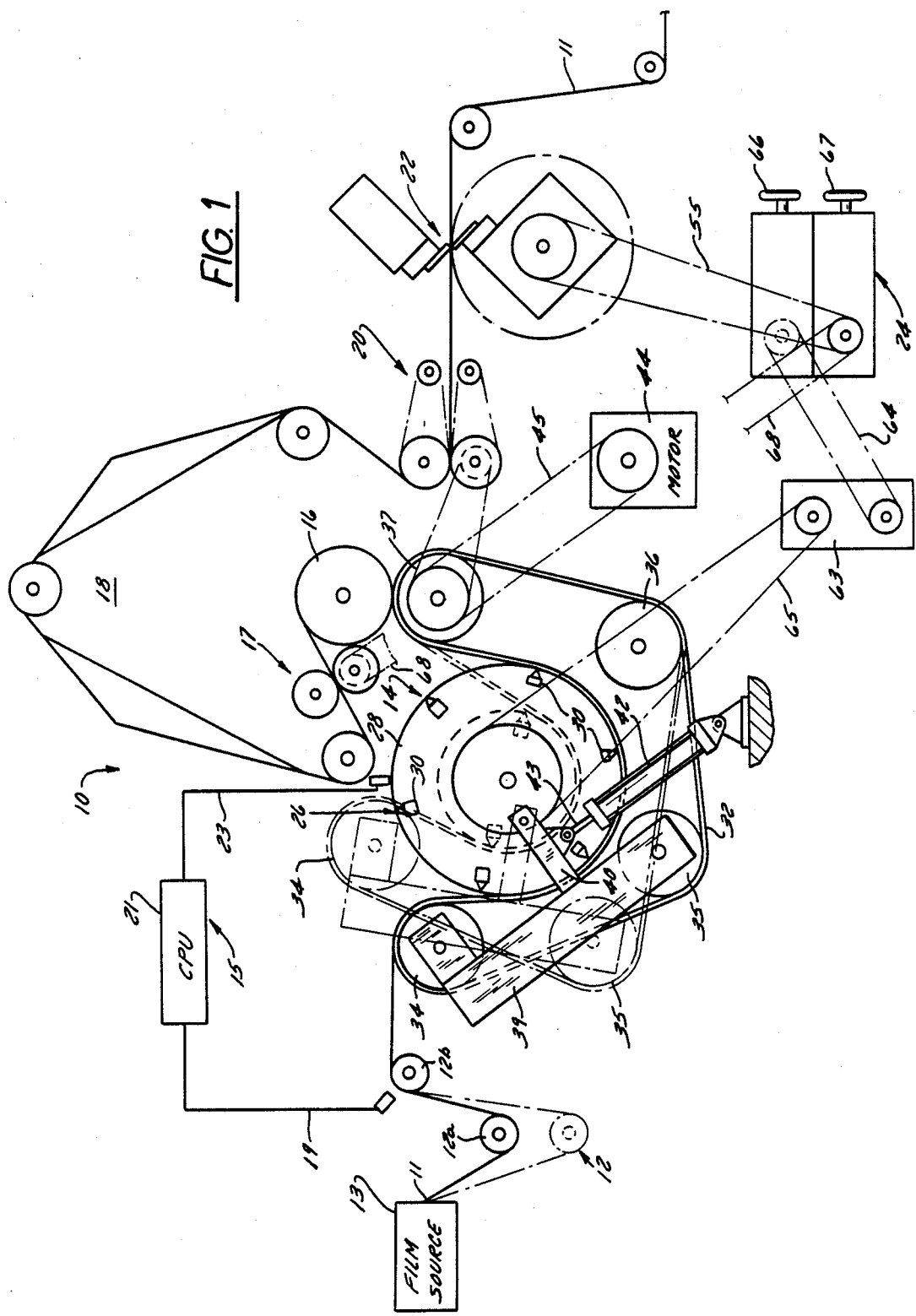
FIG. 1 is a schematic illustration of the bag making machine according to the preferred embodiment of the present invention.

In the FIGURES, like reference numerals refer to like elements. To improve the clarity of the description of the major features of the present invention, only general descriptions are provided for components which are well known in the art, and could be variously embodied by one of ordinary skill in the art after reading and understanding the principles of the present invention, and/or are specifically described in the Gietman Pat. No. '084.

DESCRIPTION OF THE PREFERRED EMBODIMENT

Before proceeding to a more detailed description of the preferred embodiment, it will be helpful to point out the basic elements of the present invention as incorporated in a bag making system such as the one disclosed in the Gietman U.S. Pat. No. '084. For this purpose, reference should first be made to the schematic diagram of FIG. 1, which shows a bag making machine 10 incorporating the present invention.

The major elements of system 10 include a dancer and idler assembly 12, a sealing drum and blanket assembly 14, a chill roll 16, a comparator unit 15, a punching station 17, a folding station 18, a pull roll system 20, a perforator/cutting station 22 and a phase variator assembly 24. The present invention is primarily concerned with the sealing drum and blanket assembly 14 and the comparator unit 15 as applied to plastic bag making machines and other machines in which a specific function is to be performed in a preselected spacing relationship to preprinted matter on pliable material.

The elements of the system shown in FIG. 1 may be configured in other ways, including removing elements shown therein. Likewise, the bag making machine 10 may have other elements added depending on the type of product being produced. For purposes of illustration, the basic system of the Gietman U.S. Pat. No. '084 will be used herein but should not be deemed limiting in any way. As noted above, this system can be employed in any mechanism wherein certain functions are to be performed in a specific spacing relationship to preprinted matter on a stream of pliable material.

Film 11 is fed from a source of plastic tubing 13 through dancer roll 12a and idler roll 12b into the sealing drum and blanket assembly 14. Source 13 may be any source for printed plastic material such as an extruder, a preprinted roll of plastic film, or a printer on which the plastic is imprinted. Dancer roll 12a and idler roll 12b maintain proper tension and speed for the bag making system.

The sealing drum and blanket assembly 14 consists of a cylindrical drum 28, which is capable of being varied in diameter. That feature is illustrated in FIG. 1 by the dotted line. A number of sealing bars 30 are also shown in FIG. 1 and periodically form cross seals across the flattened film tube 11. Sealing bars 30 are of conventional design and are disclosed in detail with respect to construction and operation in the Gietman Pat. No. '084. A blanket 32 is mounted on rollers 34, 35, 36 and 37 for surrounding a portion of drum 28 in such a way that the film 11 passes between blanket 32 and drum 28 while seals are being formed. Rollers 34 and 35 are mounted to an elongate frame 39 which is pivotable between the full and dotted line positions shown in FIG. 1. Frame 39 includes a perpendicular plate 40 near its midsection, the latter being coupled to an air cylinder 42 having an extensible rod 43. It will be appreciated that extension of rod 43 causes rollers 34 and 35 to move to the dotted line position when the drum diameter decreases, thereby maintaining tension of the blanket 32 against the drum 28.

Roller 37 is driven from a motor 44 by belt 45 to drive blanket 32, and in turn blanket 32 will rotate drum 28 due to the tension between these components. The specific construction of drum 28 will be discussed in more detail below.

After passing the chill roll 16, the film 11 next passes through an optional punching station 17 which punches preselected hole and handle configurations in the film. Thereafter, the film may be further processed as shown or in any other appropriate manner.

The final element shown in FIG. 1 is the variator system 24 which is driven from a gear box 63 by belt 64. Gear box 63 is driven by the drum 28 through belt 65. Variator system 24 also includes hand wheels 66 and 67, used to vary the phase of the perforator/cutting station 22 and the punching station 17, respectively. Adjustments to the phase of perforator/cutting station 22 are made by hand wheel 66 via belt 55. Similarly, adjustments to hand wheel 67 are communicated to punching station 17 by belt 68. It should be recognized that the variators may be adjusted while the bag making machine 10 is in operation.

Figure 2:
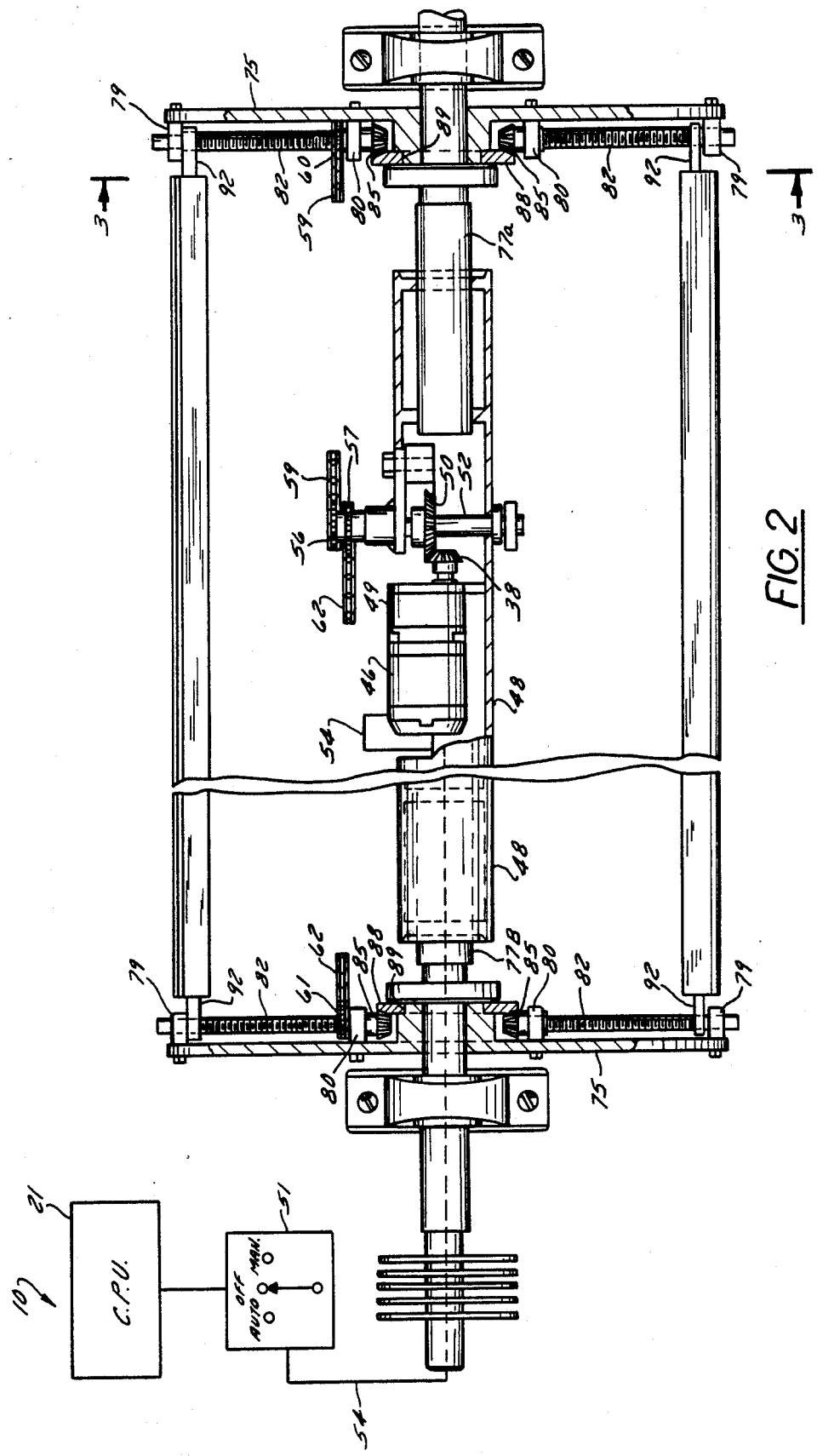
FIG. 2 is a longitudinal elevation (partially in section) of the expandable sealing drum according to the preferred embodiment of the present invention.
Figure 3:
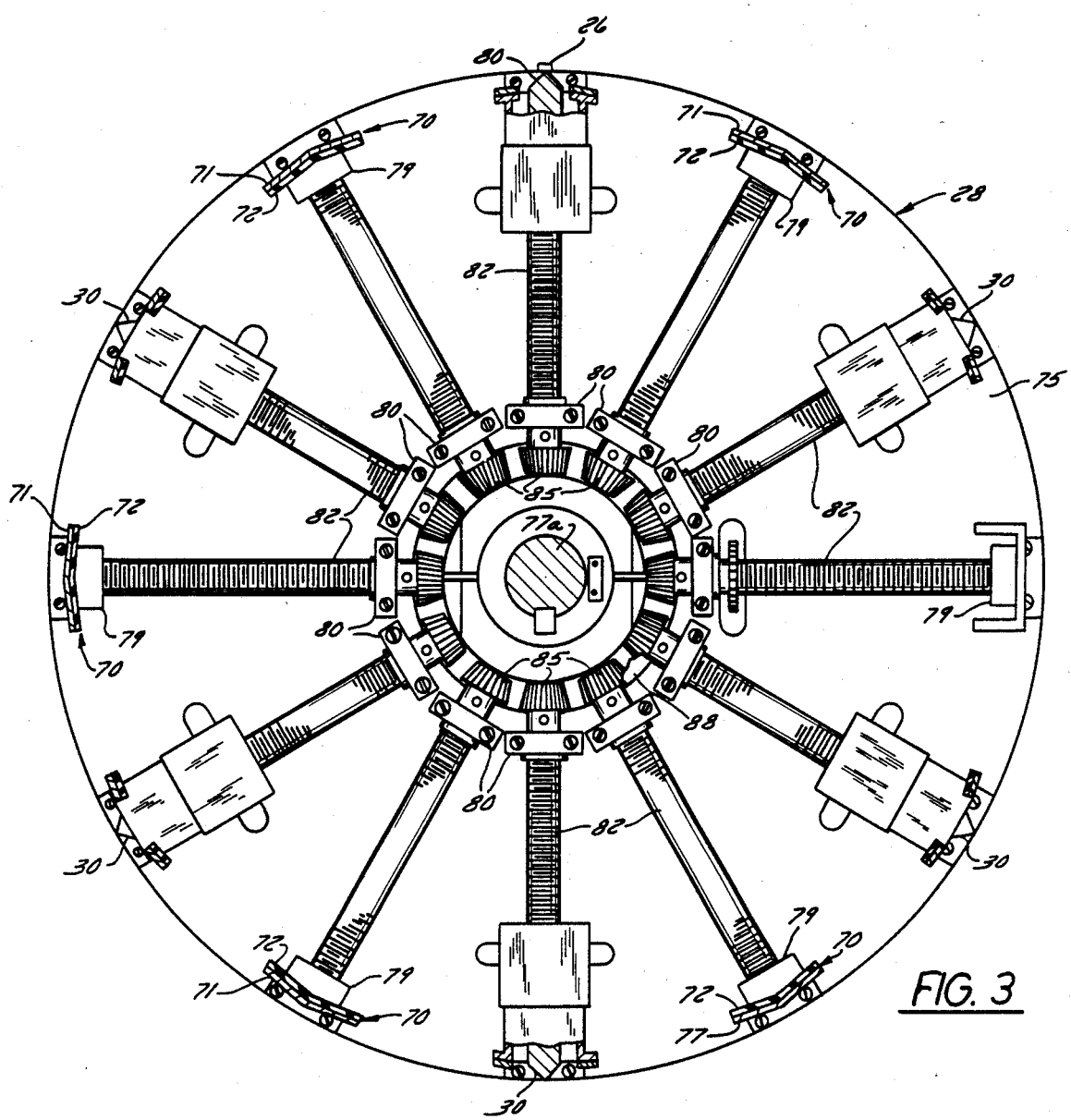
FIG. 3 is a cross-sectional view taken along the line 3—3 of FIG. 2.
Figure 4:
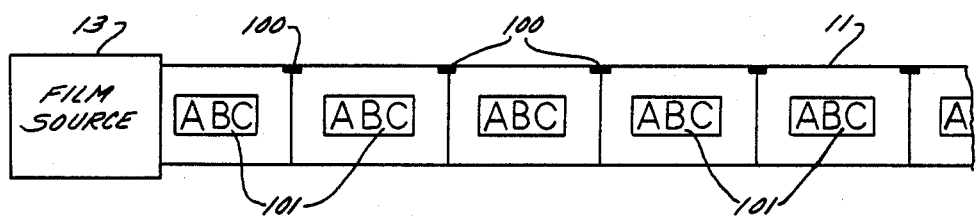
FIG. 4 is a perspective view of a length of printed plastic film as used in the preferred embodiment of the present invention.

Proceeding now to the more detailed description of the preferred embodiment of the present invention, reference is made to FIGS. 2 and 3 to illustrate the expandable sealing drum 28. Drum 28 is generally cylindrical and is comprised of a plurality of elongate slats 70. Each slat 70 includes a steel base 72 having a slightly curved exterior surface. A rubber lagging 71 is provided on the exterior surfaces to assist in maintaining proper traction between blanket 32 and drum 28.

Drum 28 also has a pair of generally circular end plates 75 and axial shaft sections 77a and 77b extending through the center of drum 28 and mounted in suitable bearings to permit rotation of drum 28. Twelve mounting plates 79 having holes therein are attached to the interior sides of each of end plates 75 near the outer edge thereof, the axis of the openings of each plate 79 being radial with respect to the axis of shaft sections 77a and 77b. Similar plates 80 are affixed to end plates 75 inwardly of plates 79 so that twelve pairs of spaced apart mounting plates (79 and 80) are disposed equidistantly around each end plate 75.

A threaded rod 82 is placed through the holes in each pair of plates 79 and 80, one end of which extends outwardly therefrom. A mitre gear 85 is mounted on the inner end of rod 82. Rotation of mitre gear 85 causes rotation of rod 82.

A pair of ring gears 88 are rotatably mounted to a machined hub of end plates 75 on bearings 89 and are constructed and arranged to mesh with mitre gears 85. Rotation of any one of the rods 82 causes rotation of the ring gear 88 and, in turn, the rotation of all twelve of the threaded rods 82 which are coupled to that particular ring gear.

Slats 70 are coupled to the threaded rods 82 by a threaded plate 92 fastened to each end of slats 70. Rotation of the rods 82 will cause plates 92 to travel up and down the length of the rods. Rotation of a rod 82 in one direction will cause the slats 70 to move radially inward, reducing the drum diameter, while rotation in the opposite direction will cause a drum diameter expansion.

Rotation of rods 82 is accomplished by motor 46 mounted in tube 48. Tube 48 is a hollow tubular section coaxially joining shaft sections 77a and 77b. Pinion 38 on gear box 49 is run by motor 46 and engages a ring gear 50 through which is mounted an axle 52. Axle 52 extends radially outward from tube 48 and has a pair of sprockets 56 and 57 mounted thereon Sprocket 56 engages chain 59 which in turn engages another sprocket 60 on one of the rods 82 mounted adjacent the end plate 75 on shaft section 77a. Similarly, chain 62 runs between sprocket 57 and sprocket 61 mounted to a rod 82 adjacent shaft section 77b.

Rotation of axle 52 by motor 46 causes the chains 59 and 62 to rotate the rods 82 adjacent each end plate 75, thereby reducing or enlarging the diameter of the drum 28. Motor 46 is energized by wires 54 which extend through shaft section 77b and tube 48 from switch 51. Switch 51 provides the operator with the option of operating motor 46 manually or permitting automatic operation with processing unit 21 in a manner to be described below. The operator may operate the motor 46 while the machine 10 is running to adjust the drum diameter during operation if desired.

Finally, comparator unit 15 will be described. As noted above, comparator unit 15 includes a central processing unit (CPU) 21. Connected to CPU 21 are a first detector 19 and a second detector 23. Detector 19 is located above the path of the film as it passes over the idler roll 12b. Idler roll 12b provides a consistent optical background for detector 19 so that registration marks 100 on the film 11 can be read accurately.

Detector 23 is positioned directly above drum 28. In the preferred embodiment, detector 23 is an electric eye device designed to generate a signal when an object passes through it. In the present invention, a small protrusion 26 is placed on drum 28, as seen in FIG. 3. Detector 23 sends a signal to CPU 21 every time drum 28 makes a complete revolution. Specific operation of CPU 21 and comparator unit 15 will be described below.

Comparator unit 15 is activated by the operator by turning switch 51 to its automatic setting. Various CPU functions may then be selected and performed.

Operation

While the operation of the bag machine of the present invention will be described with specific reference to the configuration of the Gietman U.S. Pat. No. '084 and a machine for producing plastic, it should be understood that the principles taught herein have numerous other applications. Therefore, application of the subject matter should not be limited just to plastic bag making machines.

CPU 21 is preprogrammed with preset conditions for the number of sealing bars 30 to be used (and, therefore, the number of seals per 360° of rotation of drum 28). Drum 28 is manually adjusted to the approximate proper size by switching operation to the "manual" setting on switch 51. Thereafter, the switch 51 is set on "automatic" for continuous operation.

Initially, film 11 is fed from roll 13 through the dancer and idler rolls to the blanket and drum assembly 14. As the film passes over the idler roll 12b, detector 19 reads the position of the mark registration 100 relative to the activated seal bars' position generated by detector 23, and compares this relationship to the preset conditions. Appropriate activation of the motor 46 and adjustment to drum size is then made. For example, if the seal bar position is progressively moving away from the mark registration on the film, then the drum size is too small and motor 46 will be activated to increase the drum diameter. When the seal bar holds its position relative to the mark registration, drum 28 is then set at the proper diameter.

At this point, seal bar operation and the mark registrations 100 are in phase. A shift may then be required to bring each seal and corresponding mark registration 100 into proper spacing. This is also accomplished with the CPU 21 and its automatic control of the drum size.

In order to do this, the drum size is altered temporarily to allow the mark registration 100 to "move" closer to the seal. As an example, if the registration mark needs to be moved closer to the seal, the drum size is altered to establish a known rate of advancement of the mark 100 toward the seal on each revolution of drum 28. When enough revolutions are completed, the drum is returned to its proper size and normal operation ensues. The following example is illustrative of how this is accomplished, but is not in any way limiting on the use of the equipment or the components therein.

If the registration mark is 6 inches away from the desired relative position to the seal, the drum circumference may be reduced by $\frac{1}{2}$ inch. Thus, after every revolution of the drum, the registration mark is $\frac{1}{2}$ inch closer to the seal. After 12 revolutions, the seal and registration mark will be properly spaced. Drum 28 is then expanded to the original circumference and normal operation of the machine may recommence.

During normal operation of the machine, plastic film 11 is fed from the roll 13 through the dancer roll 12a and idler roll 12b to the blanket and drum assembly 14 where heat seals are applied. The plastic film may be configured so that the seals define the bottoms of plastic bags being formed. Alternatively, the seals may define the sides of the bags. In this situation, the plastic film 11 is slit longitudinally down the middle, the middle slit being the top opening of each bag being formed.

Utilizing the drum sizing and the registration mark/seal orientation functions of the comparator unit 15, seals may be consistently placed in proper orientation to any printed matter appearing on the film. As the film 11 leaves the blanket and drum assembly 14, it encounters the chill roll 16 which cools the heat seals.

The plastic is next fed to the punching station 17 where handles may be punched into or out of the plastic and the bag's configuration may be further defined. For example, "t-shirt" bags are quite popular in supermarkets and grocery stores at present. These bags have a lower bag section and two handles that resemble the shoulder straps of a tank top t-shirt. This configuration may be punched on the apparatus shown.

From the punching station 17, the film may be fed to a folding station 18 as disclosed in the Gietman Pat. No. '084. From folding station 18 film 11 may next move to the perforator/cutting station 22 where perforations can be placed between bags or where the bags may be completely separated. As shown in the Gietman U.S. Pat. No. '084, the separation between bags may also be partially slit, partially perforated. The bags then move on to a packaging operation.

In the preferred embodiment, the punching station 17 and perforator/cutting station 22 are run off of the same gear box 63 connected to the drum 28. Variator system 24 allows adjustments to these stations so that there is no phase variance between seals, handle cuttings and perforation or cutting.

The comparator unit 15 serves one other function during operation of the machine. The two detectors 19 and 23 are continuously measuring the moving averages, and changes therein, of the discrepancy between the actual spacing between the registration mark and the seal and the preset, or desired spacing.

When the discrepancy reaches a preselected limit, the CPU 21 instructs the motor 46 to make a minor adjustment in the size of the drum 28 to compensate. The drum diameter may be slightly increased or decreased. This compensation function is continuous and ongoing so that the printed matter 101 is maintained in a consistent position on the bags.

Unlike systems designed to perform the same functions, the improvements to the bag making machine as disclosed herein and in the Gietman U.S. Pat. No. '084 allow these machines to operate at speeds far in excess of those of the prior art.

While one preferred embodiment of the present invention is shown in the FIGURES and described in detail herein, modifications and variations could be developed by one of ordinary skill in the art after the objects of the invention are understood. For example, in any operation in which a specific function such as perforation or punching needs to be performed on a continuous stream of pliable material (e.g., paper or cloth) having printed matter thereon, in a preselected spacing relation, this system can easily be adapted to perform efficiently and easily. Accordingly, the present invention is not to be limited to the specifically disclosed preferred embodiment, but rather only by the scope of the claims which follow.

What is claimed is:

1. A machine for making plastic bags from plastic film, said machine including sealing means comprising a cylindrical drum that is continuously adjustable for infinite variation of the diameter of said drum between a first smaller diameter and a second larger diameter while said machine is being operated, said drum comprising:
    an axis;
    a plurality of side members parallel to said axis, including at least one sealing bar;
    first and second ends including rod means for supporting said side members and means for simultaneously altering the radial position of said side members while maintaining the parallel orientation of said side members to said axis;
    motor means for driving said altering means;
    blanket means surrounding a portion of said drum and means for driving said blanket means to cause rotation of said drums;
    said altering means including a first set of rods extending radially outward from said axis of said drum at the first end of said drum and a second set of rods extending radially outward from said axis of said drum at the second end of said drum, said first and second sets of rods being connected by mitre gears at the inner end of each of said rods, said mitre gears of said first set of rods engaging a first ring gear mounted in surrounding orientation to the axis of said drum, the mitre gears of said second set of rods engaging a second ring gear mounted in surrounding orientation to the axis of said drum, said first and second sets of rod being operatively connected by said motor means; and
    said motor means including a bidirectional motor mounted along aid axis of said drum and being operatively connected to said first set of rods by a first chain and to said second set of rods by a second chain, so that when said motor is run in one direction the diameter of said drum decreases toward said first size and when said motor is run in the other direction, the diameter of said drum increases toward said second size.

2. A machine for making plastic bags from plastic film having a repeated design thereon, said film including a reference mark corresponding to each of said designs, said film moving along a path, said machine including:
    cylindrical sealing means along said path for periodically placing a transverse seal in said film, each of said seals corresponding to one of said marks, means for driving said sealing means, and processing means for comparing the spacing between each of said marks and said corresponding seals and adjusting the diameter of said sealing means so that the spacing between said marks and said corresponding seals are at a preselected spacing interval, said sealing means comprising a cylindrical drum including:
    an axis;
    a plurality of side members parallel to said axis and including at least one sealing bar;
    first and second ends comprising means for simultaneously altering the radially position of said side members while maintaining the parallel orientation of said side members to said axis;
    motor means for driving said altering means;
    said altering means including a first set of rods extending radially outwardly from said axis of said drum at the first end of said drum, and a second set of rods extending radially outwardly from said axis of said drum at a second end of said drum, said first and second sets of rods being connected by gear means comprising a mitre gear at the inner end of each of said rods, the mitre gears of said first set of rods engaging a first ring gear mounted in surrounding orientation to the axis of said drum, the mitre gears of said second set of rods engaging a second ring gear mounted in surrounding orientation to the axis of said drum, said first and second sets of rods engaging a second ring gear mounted in surrounding orientation to the axis of said drum, said first and second sets of rods being operatively connected by said motor means, said motor means being a bidirectional motor mounted along said axis of said drum, said motor being operatively connected to said first set of rods by a first chain, said motor being operatively connected to said second set of rods by a second chain, so that when said motor is run in one direction the diameter of said drum decreases towards a first size and when said motor is run in the other direction, the diameter of said drum increases towards a second size.

3. The machine of claim 2 wherein said processing means for comparing the spacing between said marks and said corresponding seals placed on said film comprises a microprocessor means.

4. The machine of claim 2 wherein said side members comprise a plurality of sealing bars and means are provided for selectively activating one or more of said sealing bars and wherein said processing means includes first detecting means for measuring the spacing between activated sealing bars and second detecting means for measuring the spacing between said marks and means for determining the spacing between said marks and said corresponding seals placed on said film by said activated sealing bars.

5. The machine of claim 4 wherein said first detector is an electric eye and wherein said second detector is an optical reader, and wherein said processing means further includes microprocessor means connected to said motor so that said microprocessor means activates said motor to adjust the diameter of said drum.

6. A machine for making plastic bags from plastic film having a repeated design thereon, including a reference mark corresponding to each of said designs moving along a path, said machine including:
sealing means along said path for periodically placing a transverse seal in said film, each one of said seals corresponding to one of said marks;
means for driving said sealing means;
blanket means surrounding a portion of said sealing means;
means for driving said blanket means;
means for cutting and perforating said film transversely to form separable interconnected bags; and
control means for comparing the spacing between each of said marks and said seals and adjusting the diameter of said sealing means so that the spacing between said marks and said seals is consistent at a preselected spacing interval; and
said sealing means includes a cylindrical drum comprising:
an axis;
a plurality of side members parallel to said axis which include a plurality of slats and a plurality of sealing bars; and
an adjusting means including a first set of rods extending radially outwardly from the axis of said drum at the first end of said drum to said side members and a second set of rods extending radially outwardly from said axis of said drum to said side members at the second end of said drum, said first and second sets of rods being connected by gear means comprising a mitre gear at the inner end of each of said rods, the mitre gears of said first set of rods engaging a first ring gear mounted in surrounding orientation to the axis of said drum, said first and second sets of rods being operatively connected by motor means including a bidirectional motor mounted along said axis of said drum, said motor being operatively connected to said first set of rods by a first chain, said motor means being operatively connected to said second set of rods by a second chain, so that when said motor is run in one direction the diameter of said drum decreases towards said first size and when said motor is run in the other direction the diameter of a drum increases toward a second size.

7. The machine of claim 6 wherein said control means includes a first detector adjacent said drum and a first member on said drum designed to be detected by said first detector, and a second detector adjacent the path of said film, designed to detect each of said marks as it passes said second detector and microprocessor means for determining the spacing difference between said marks and said corresponding seals placed on said film by said activated sealing bars and wherein said first detector is an electric eye and wherein said second detector is an optical reader and wherein said microprocessor means is coupled to said motor so that said microprocessor means activates said motor to adjust the diameter of said drum.

* * * * *